United States Patent [19]

Harned et al.

[11] 3,975,860

[45] Aug. 24, 1976

[54] PLANTER AND RESERVOIR

[75] Inventors: Harold Harned, Reidsville; William G. Hilliard, Whitsett; Clayton G. Williams, Reidsville, all of N.C.

[73] Assignee: Zarn, Inc., Reidsville, N.C.

[22] Filed: Aug. 21, 1975

[21] Appl. No.: 601,390

[52] U.S. Cl. .................................. 47/38.1; 47/35
[51] Int. Cl.² ..................................... A01G 27/00
[58] Field of Search ................. 47/35, 34, 38–38.1

[56] References Cited
UNITED STATES PATENTS

| | | | |
|---|---|---|---|
| 681,672 | 9/1901 | Andrews | 47/38.1 |
| 1,077,423 | 11/1913 | Myers | 47/35 |
| 1,977,827 | 10/1934 | Kneller | 47/38.1 |
| 2,130,234 | 9/1938 | Haglund | 47/38.1 |
| 3,009,603 | 11/1961 | Stockdale | 47/34 X |

FOREIGN PATENTS OR APPLICATIONS

| | | | |
|---|---|---|---|
| 1,033,946 | 7/1958 | Germany | 47/38 |

*Primary Examiner*—Robert E. Bagwill

[57] ABSTRACT

A planter and reservoir combination in which the reservoir is integrally molded at the bottom of the planter to support a plant supporting base.

7 Claims, 5 Drawing Figures

U.S. Patent  Aug. 24, 1976  3,975,860
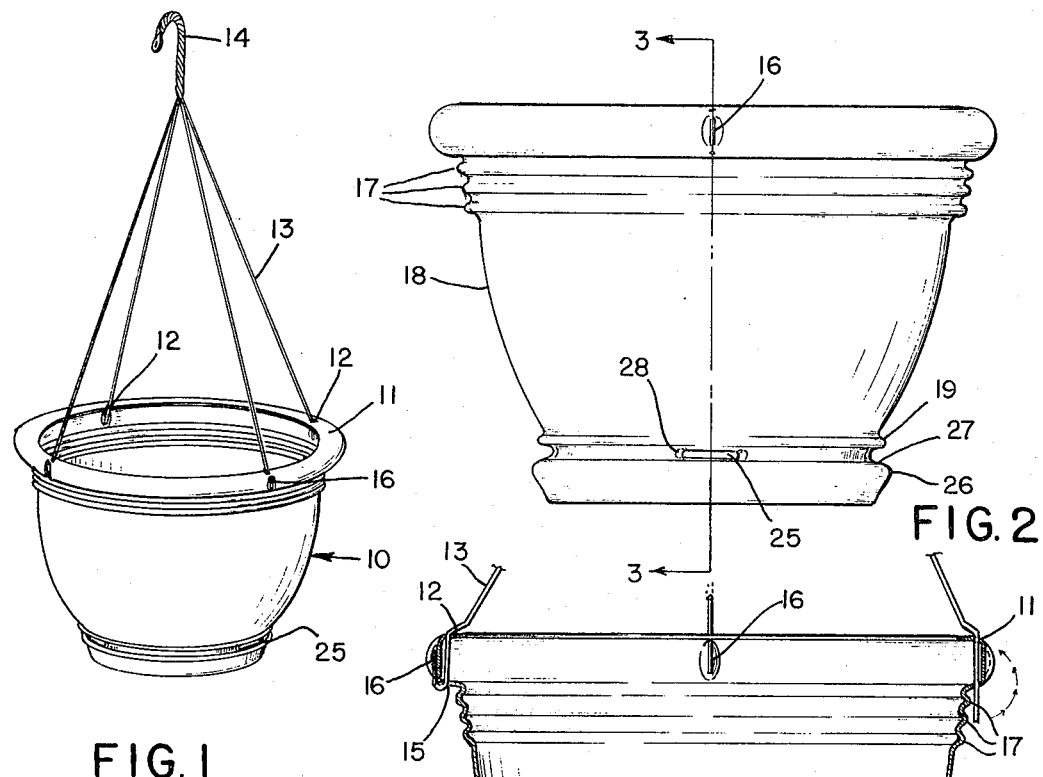
FIG. 1
FIG. 2
FIG. 3
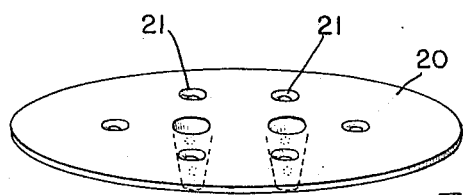
FIG. 5
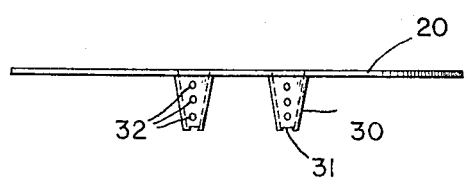
FIG. 4

PLANTER AND RESERVOIR

BACKGROUND, OBJECTIVES AND ADVANTAGES OF THE INVENTION

It has become very popular in today's ecological movement to have live plants in and around homes. Many plants are purchased from nursery and flower shops and are replanted in inexpensive hanging planters. Usually, the hanging planters are hung from wall brackets, or a ceiling inside the house, porch or patio. Many nurseries insist that they use the least expensive planter that is adequate to accomplish the necessary growth.

Presently, the only relatively inexpensive hanging planters in common use are those that have been made by injection molding as contrasted to the expensive decorative show pieces made of ceramic or pottery which is usually vitrified. Injection molded planters are usually made from rigid polystyrene or polyolefins of relatively low molecular weight and tend to crack or shatter easily, and are incapable of withstanding prolonged exposure to ultraviolet light.

Generally the injection molded planter has a bowl with drain holes at the base with some provision made for releasably attaching an injected molded saucer to serve as a reservoir to catch water in the event excess water is furnished to the plant. The separate saucer is either shaped to the base or held in some other suitable manner. Many inexpensive injection molded planters are designed to be nested for ease of shipment and storage with the saucer attached. Relatively inexpensive wire hangers are provided for attaching or hanging the planter after potting.

It is an objective of the present invention to provide a less expensive and unique blow molded plastic planter which may be hung but has all of the advantages of more costly planters and one that is made from high density, high molecular weight polyethylene that is virtually unbreakable and is stabilized against ultraviolet degradation.

Another objective of this invention is to provide a planter with a reservoir at the base of the integral construction in which openings are provided in the base adjacent to the reservoir for evaporation of excess water from the reservoir and access of oxygen to the bottom of the potting medium.

Still another object of this invention is to provide a planter with reservoir that may be readily hung or suspended and in which there is an intermediate partition between the potting medium and a water reservoir with openings at spaced intervals communicating with the reservoir permitting evaporation of excess water and access of oxygen.

Still another object of this invention is to provide a combination planter and reservoir in which there is a tapered outer surface and openings spaced from the base of the planter in the portion of the reservoir enabling any water that overflows to run down the exterior wall of the planter and enter the openings exposed to the reservoir.

Still another objective of this invention is to provide means for releasably supporting a potting medium support in the planter and in which the potting medium support member provides a "wicking" action from the planter reservoir beneath the partition to the potting medium above the partition.

Still another objective is to provide a lightweight but structurally sound intergral planter bowl and reservoir in which the top of the bowl has a greater wall thickness for increased strength and the provision of a series of strenghening ribs at selected portions of the planter providing additional stiffness for the weighted planter for hanging support.

Yet another objective of this invention is to provide lightweight and structurally sound planters that may be nested for shipping and storage that are shatterproof and that will resist ultraviolet degradation.

Other objects and many of the attendant advantages of this novel planter and reservoir will be come more readily apparent from the accompanying drawing and a detailed description thereof:

IN THE DRAWING

FIG. 1 is a front perspective view of a hanging planter and reservoir embodying this invention;

FIG. 2 is an enlarged front elevational view of the planter and reservoir of FIG. 1 with the planter hanger member removed;

FIG. 3 is a transverse sectional view taken substantially along the plane of section line 3—3 of FIG 2. with only a portion of a hanger member shown through one opening of the planter;

FIG. 4 is an end elevational view of a potting medium spacer and support; and

FIG. 5 is a front perspective view showing the partition member of FIG. 4 in a tilted position.

DETAILED DESCRIPTION OF ONE PREFERRED EMBODIMENT OF THE INVENTION

Referring to the drawing and particularly to FIG. 1, there is illustrated in FIG. 1 a combination planter and reservoir 10 preferably made of high density, high molecular weight polyethylene which is stabilized utilizing an ultraviolet stabilizer that is well known for utilization in polyethylene materials. The planter 10 as shown in FIG. 1 is tapered downwardly and is provided with an upper inturned rim 11 in which there are circumferentially spaced openings 12 to receive and retain the suspending wires 13 that are twisted to form the hook-like end 14 for suspending the planter and reservoir 10. One manner of connecting a wire 13 through the lip or rim 11 is to pass it through the top opening 12 and through a lower opening 15 in the base of the rim 11 and the wire 13 is bent inwardly into a recess 16 that is formed in the periphery of the rim 11 so as not to protrude objectionably, as shown in FIGS. 1 and 3.

The upper portion of the planter is provided with a series of rounded circumferential ribs 17 which provide increased rigidity to the relatively thin wall of the planter above the downwardly tapering wall 18 of the planter forming the main body thereof. The lower end of the downwardly tapering wall 18 and merging therewith is a single circumferential protruding rib 19 which forms the support for a circular partitioning member 20, preferably also made of polyethylene and provided with a series of openings 31 therein on which the potting medium (not shown) is supported with the perimeter 22 of the partition being seated in the radiused interior of the rib 19 thereby separating the planter into an upper portion 23 for the planter or potting medium and a lower reservoir portion 24 in which water may be collected.

A series of elongated openings 25 are formed in circumferentially-spaced relation beneath the rim 19 which extend inwardly into the reservoir 24 beneath the partition 20. An outwardly extending flange base 26 is flared outwardly for at least the same diameter as the rib 19 thereby forming a ledge 27 on which excess water may drip and be collected to flow into the openings 25 which are suitably radiused 28 to facilitate entry of water into the reservoir 24. Oxygen access is also permitted through the openings 25 into the reservoir 24 as well as excess evaporation of water from the reservoir 24 through the openings 25 that may have drained into the reservoir from the potting medium above the partition to the openings 21 therein.

The bottom of the planter at the base of the reservoir has a flat bottom 29 preferably which is suitable for placing on a flat surface. Obviously, other base contours may be utilized where desirable.

The partition member 20 is preferably provided with a plurality of leg members 30 that are preferably integrally formed in the petition to provide added support for the potting medium and the relatively thin plastic partition member 20. The bottom of the legs 30 may be provided with openings 31 if desirable, and the legs may also be provided with openings 32 for further drainage as well as "wicking" action for the potting medium above the partition.

It has been found desirable to blow mold two units in a single cavity from one parison and the two units may be separated by a knife or other suitable separating means. The openings 25 may be suitably cut in the final form of a blow molded unit in the event any excess plastic adhears in the opening or slot 25.

The partition 20 is preferably molded separately and may be formed of a circular disc but it is preferred to mold a unit with depending legs 30 as shown in FIGS. 3 through 5.

It has been found by the utilization of blow molding machinery that is equipped with parison programming, the wall thickness may be controlled readily to provide a lightweight but substantially rigid wall hanger and reservoir with the top of the bowl 23 having a greater wall thickness than the lower portion. The ribs have been provided with a suitable radius which may be thicker than the remainder of the wall thereby providing additional stiffness for the hangers. It has been further found desirable that the tapered configuration enables ease of nesting for storage and shipping.

It has been further found desirable to extend the surrounding material for the opening 25 thereby providing increased ledge support for the partition 20 at circumferentially spaced points in the interior of the hanger as shown in FIG. 3.

It will be readily apparent that the ultimate thickness of the blow molded planter may vary depending upon the overall size and configuration while retaining the basic elements of novelty for the strengthening ribs, downwardly formed bowl, and the partitioned rib and drain contour leading into the reservoir openings in the base of the planter.

We claim:

1. A blow-molded plastic planter and reservoir comprising; a tapered shell having an upper potting medium-receiving section and a bottom water-receiving reservoir section, said upper section having an upper inturned lip and at least one circumferential radiused rib spaced from said lip, an intermediate bowl section, an outwardly extending radiused rib adjacent to said reservoir section below said intermediate bowl section adjacent to said reservoir section forming a partition-supporting internal rim, a flared base extending circumferentially in spaced vertical relation to said outwardly extending rib and at least having the same circumferential extent thereof forming an indentation between said outwardly extending rib and said flared base, at least one opening in said indentation communicating with said reservoir section beneath said partition supporting internal rim, and a partition mounted in said internal rim.

2. A blow-molded plastic planter and reservoir as claimed in claim 1, said upper section having a plurality of circumferential radiused ribs in series adjacent to said inturned lip.

3. A blow-molded plastic planter reservoir as claimed in claim 1, having a plurality of circumferentially spaced hanger-receding openings in said lip, and hanger means supported in said openings for supporting the planter and reservoir.

4. A blow-molded plastic planter and reservoir as claimed in claim 1, said indentation between said base and said outwardly extending partition supporting rib having a plurality of circumferentially spaced openings for receiving water collecting on said indentation for flow into said reservoir through said indentation openings.

5. A blow-molded plastic planter and reservoir as claimed in claim 1, said tapered shell upper section having a greater thickness than said lower reservoir section.

6. A blow-molded plastic planter and reservoir as claimed in claim 1, said partition having depending legs for engaging said flared base for supporting said partition above said reservoir section.

7. A blow-molded plastic planter and reservoir as claimed in claim 1, said partition having depending legs extending within said water-receiving reservoir section, said partition and said legs having openings therein whereby water may drain into said reservoir section to be absorbed by a potting medium in said potting section by wicking.

* * * * *